(12) United States Patent  (10) Patent No.: US 7,538,827 B2
Chou  (45) Date of Patent: May 26, 2009

(54) PIXEL STRUCTURE

(75) Inventor: Rey-Yuan Chou, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 243 days.

(21) Appl. No.: 11/164,279

(22) Filed: Nov. 17, 2005

(65) Prior Publication Data

US 2007/0109454 A1    May 17, 2007

(51) Int. Cl.
*G02F 1/133* (2006.01)
(52) U.S. Cl. .......................... 349/33; 349/32
(58) Field of Classification Search .................. 349/43, 349/42
See application file for complete search history.

(56) References Cited

U.S. PATENT DOCUMENTS 5,151,806 A * 9/1992 Kawamoto et al. ............ 349/39
5,742,075 A * 4/1998 Burns et al. .................. 257/59
5,747,928 A * 5/1998 Shanks et al. ............... 313/498
5,821,688 A * 10/1998 Shanks et al. ............... 313/498
6,017,794 A * 1/2000 Burns et al. ................. 438/258

* cited by examiner

*Primary Examiner*—K. Cyrus Kianni
(74) *Attorney, Agent, or Firm*—Jianq Chyun IP Office (57) ABSTRACT

A pixel structure comprises a substrate, a first metal layer, a dielectric layer, a semiconductor layer, a second metal layer, a patterned floating metal layer and a pixel electrode. The first metal layer, disposed on the substrate, comprises a gate and a scan line electrically thereto. The dielectric layer, overlapped by the semiconductor layer, is disposed on the substrate and overlapping the first metal layer. The second metal layer comprises a source/drain, disposed on the semiconductor layer and partially overlaps the gate, and a data line, electrically connects to the source and partially overlapped with the scan line. The pixel electrode electrically connects to the drain. Additionally, the patterned floating metal layer is disposed between the dielectric layer and the semiconductor layer, beneath the source/drain and partically overlapping the gate.

11 Claims, 8 Drawing Sheets

PIXEL STRUCTURE

BACKGROUND OF THE INVENTION

1. Field of the Invention

The present invention relates to a pixel structure of a thin film transistor (TFT) array substrate, and more particularly to a pixel structure for lowering a parasitic capacitance formed between a first metal layer and a second metal layer.

2. Description of Related Art

The rapid development of semiconductor devices and display panels contributes to the quantum leap for a multimedia society. Take the display for an example. A cathode ray tube (CRT) has enjoyed the monopoly in the display market due to its low cost and superior display quality. However, the CRT fails to follow the current trends because of low-power consumption, bulky volume (i.e. high compactness) and so forth. Therefore, a TFT liquid crystal display (TFT-LCD) has replaced the CRT and become the mainstream product in the display market because of its superior display quality, high compactness, low-power consumption, and free-radiation safety.

The TFT-LCD comprises a thin film transistor (TFT) array substrate, a color filter substrate and a liquid crystal layer, wherein the TFT array substrate further includes a plurality of arrayed TFTs and pixel electrodes disposed to correspond to each TFT, respectively. Additionally, the arrayed TFTs are used as the switching element for turning on its corresponding liquid crystal display unit, respectively. Additionally, for controlling each individual pixel, a certain scan line and a certain data line are selected to turn on a certain pixel to display in accordance with supplied display data through enabling these certain scan lines and data lines.

Figure 1:
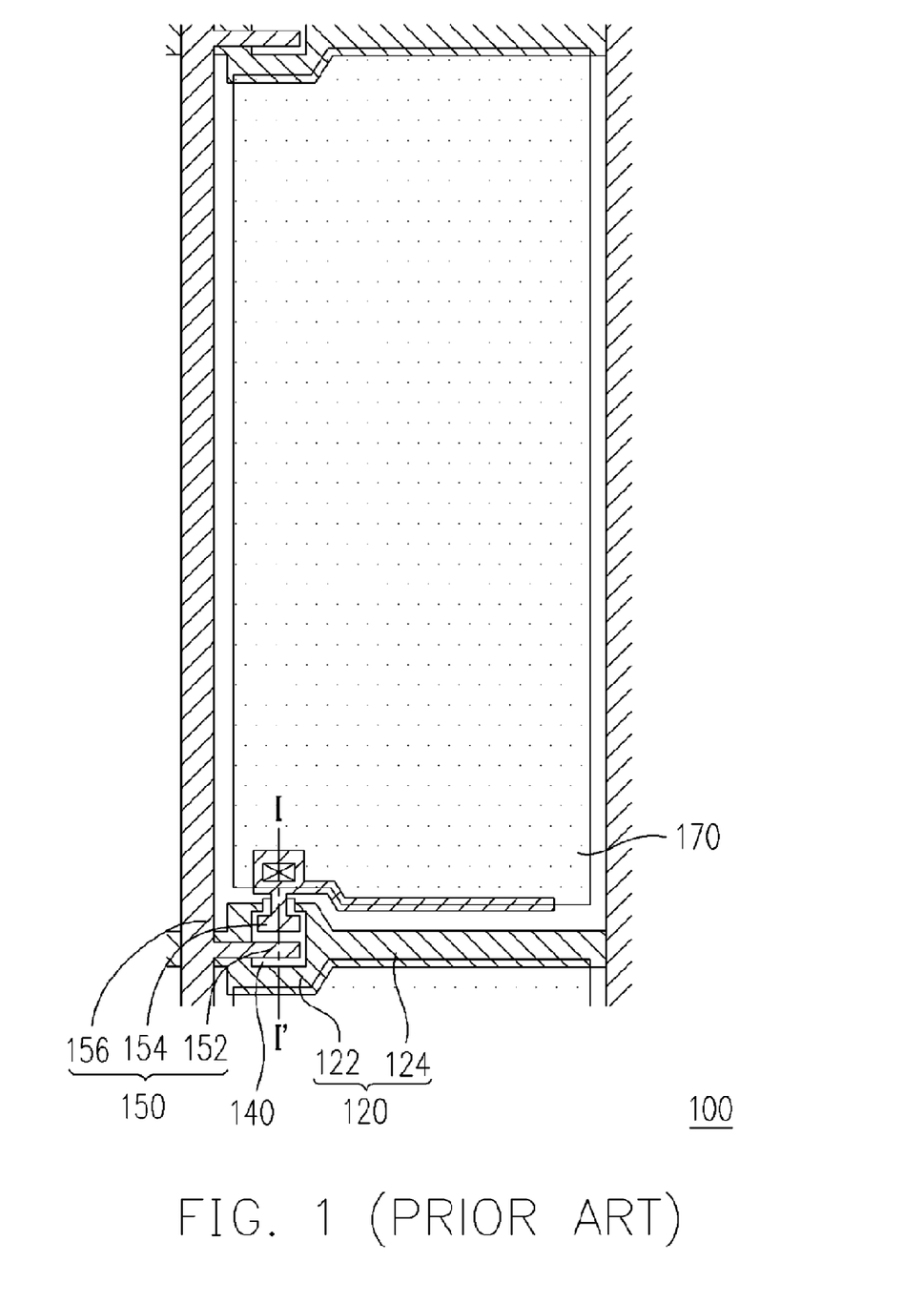
FIG. 1 shows a top view of a conventional pixel structure of a TFT array substrate.
Figure 2:
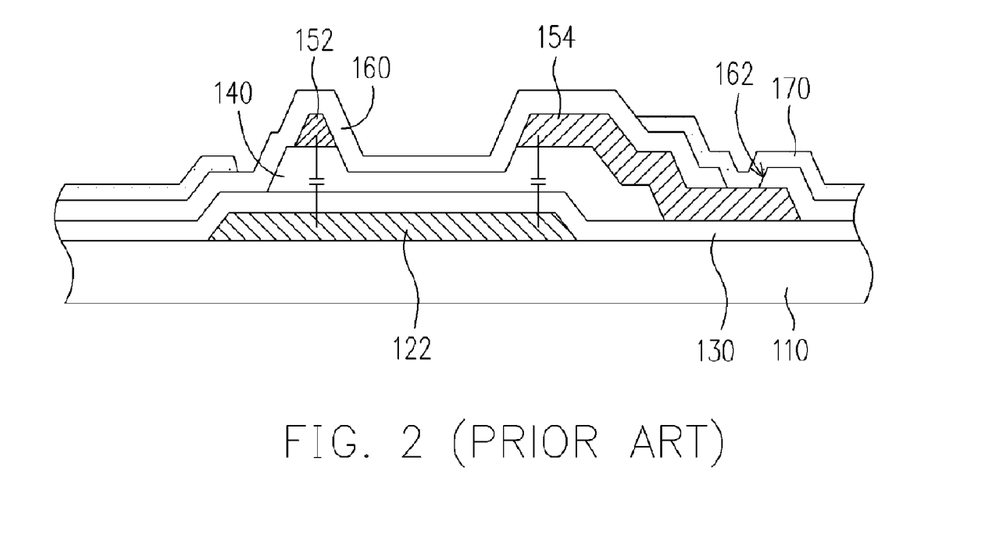
FIG. 2 is a cross-sectional view of the line I-I' shown in FIG. 1, showing the conventional pixel structure of the TFT.

FIG. 1 shows a top view of a conventional pixel structure of a TFT array substrate. FIG. 2 is a cross-sectional view of the conventional pixel structure of the TFT array substrate, providing the cut-open view of the line I-I' shown in FIG. 1. Referring to FIGS. 1 and 2, the conventional pixel structure 100 of the TFT array substrate comprises a substrate 110, a first metal layer 120, a dielectric layer 130, a semiconductor layer 140, a second metal layer 150, a protection layer 160 and a pixel electrode 170. The first metal layer 120, disposed on the substrate 110, comprises a gate 122 and a scan line 124 electrically thereto. The dielectric layer 130, covered by the semiconductor layer 140 and disposed on the substrate 110, covers the first metal layer 120 including the gate 122. The second metal layer 150 comprises a source/drain 152/154, disposed on the semiconductor layer 140, which partially overlaps the gate 122, and a data line 156, which electrically connects to the source 152 and partially overlaps the scan line 124. In addition, the protection layer 160, disposed on the substrate 110, overlaps the first metal layer 120 and the second metal layer 150. The protection layer 160 comprises an opening 162 for exposing the drain 154, wherein the pixel electrode 170 electrically connects to the drain 154 through the opening 162 of the protection layer 160.

In the conventional pixel structure 100, the first metal layer 120 and the second metal layer 150 are partially overlapped, so as a parasitic capacitance is produced in the overlapped location thereof. In other words, the parasitic capacitance occurs between the gate 122 and the source/drain 152/154 and the area between the scan line 124 and the data line 156, so that the parasitic capacitance affects the pixel's voltage causes a signal distortion and the display quality of the LCD degrades.

SUMMARY OF THE INVENTION

Accordingly, the present invention is directed to provide a pixel structure for reducing parasitic capacitance between a first metal layer and a second metal layer, thereby further improving the display quality of an LCD.

Based on the above objectives and other objectives, the present invention provides a pixel structure comprises a substrate, a first metal layer, a dielectric layer, a semiconductor layer, a second metal layer, a patterned floating metal layer and a pixel electrode. The first metal layer, disposed on the substrate, comprises a gate and a scan line electrically thereto. The dielectric layer, covered by the semiconductor layer and disposed on the substrate, overlaps the first metal layer. The second metal layer comprises a source/drain, disposed on the semiconductor layer, partially overlaps the gate, and a data line, which electrically connects to the source and partially overlaps the scan line. The pixel electrode electrically connects to the drain. Additionally, the patterned floating metal layer is disposed between the dielectric layer and the semiconductor layer. A portion of the patterned floating metal layer, located in the, partially overlaps the gate.

Said pixel structure further comprises a pad layer, disposed on the area of the dielectric layer between the scan line and the data line. The patterned floating metal layer is disposed between the pad layer and the dielectric layer, wherein the pad layer and the semiconductor layer are formed on the same layer.

Said pixel structure, the first metal layer further comprises a common line, which is substantially parallel to the scan line and partially overlaps the data line. Additionally, said pixel structure further comprises a pad layer, disposed on the area of the dielectric layer located between the scan line and the data line, and on the area of the dielectric layer between the common line and the data line. The patterned floating metal layer is disposed between the pad layer and the dielectric layer, wherein the pad layer and the semiconductor layer are formed on the same layer.

In one embodiment of the present invention, the patterned floating metal layer is identical to that of the second metal layer. Additionally, the pixel structure further comprises a pad layer, disposed on the patterned floating metal layer and the data line. The pad layer and the semiconductor layer are formed on the same layer, wherein material of the patterned floating metal layer may be an opaque metal.

In said pixel structure, material of the patterned floating metal layer may be a transparent metal.

In said pixel structure, thickness of the patterned floating metal layer may range from 100 angstrom to 1800 angstrom.

In said pixel structure, thickness of the patterned floating metal layer may range from 500 angstrom to 1500 angstrom.

In said pixel structure, the semiconductor layer may comprise a channel layer and an ohmic contact layer disposed on the channel layer.

Said structure further comprises a protection layer, disposed on the substrate and overlapping the first metal layer and the second layer. Additionally, the protection layer further comprises an opening for exposing the drain, wherein the pixel electrode electrically connects to the drain through the opening of the protection layer.

In the present invention, parasitic capacitances connected in series are produced in the areas between the first metal layer and the patterned floating metal layer, and the second layer and the patterned floating metal layer by depositing the floating patterned metal layer. Accordingly, the present invention can reduce the parasitic capacitance between the first metal layer and the second layer to upgrade the display quality of the LCD.

The objectives, other features and advantages of the invention will become more apparent and easily understood from the following detailed description of the invention when taken in conjunction with the accompanying drawings.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to an inverter circuit of a present preferred embodiment of the invention, examples of which are illustrated in the accompanying drawings. Wherever possible, the same reference numbers are used in the drawings and the descriptions to refer to the same parts.

The First Embodiment

Figure 3:
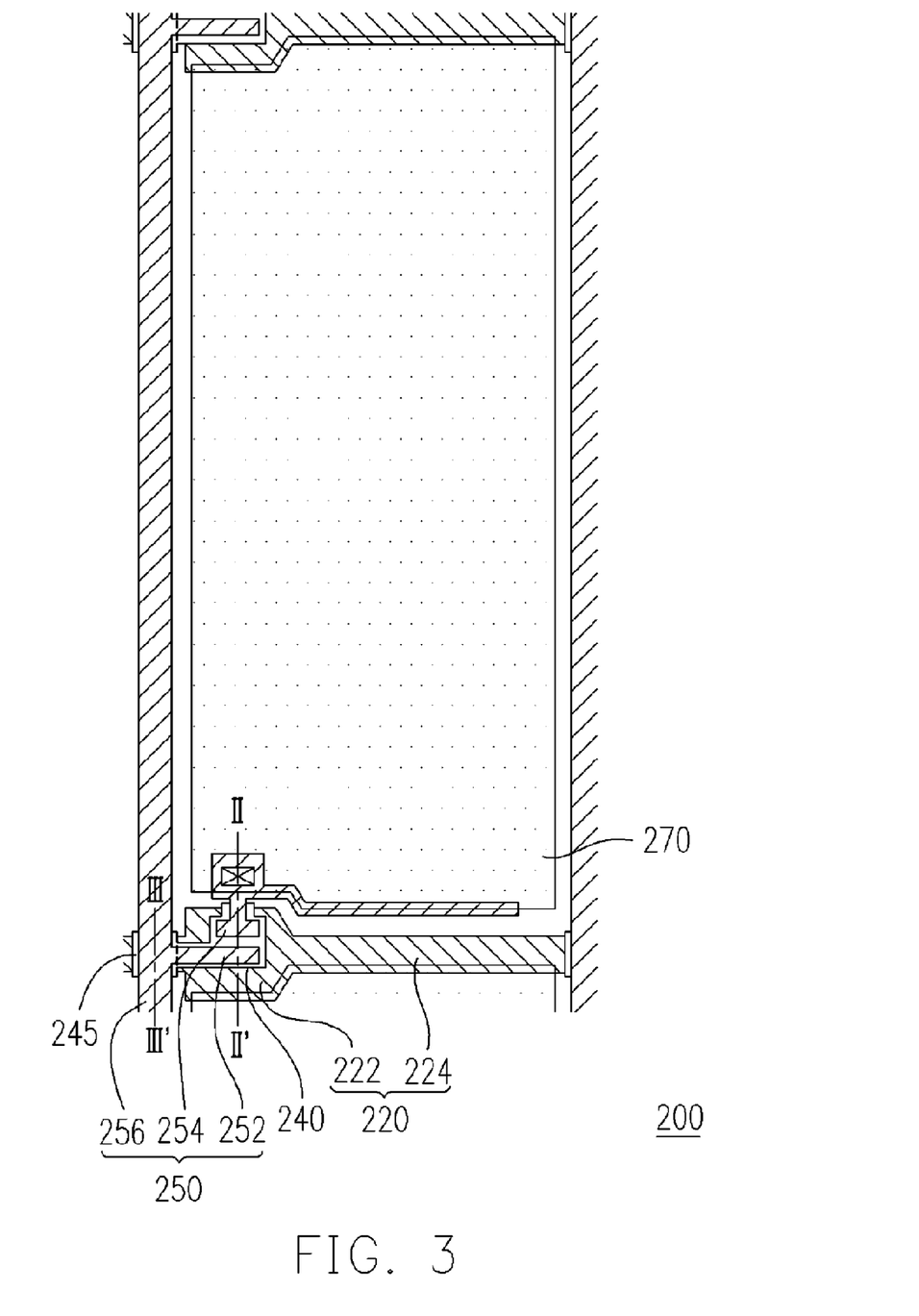
FIG. 3 shows a top view of a pixel structure of a preferred embodiment of the present invention.
Figure 4A:
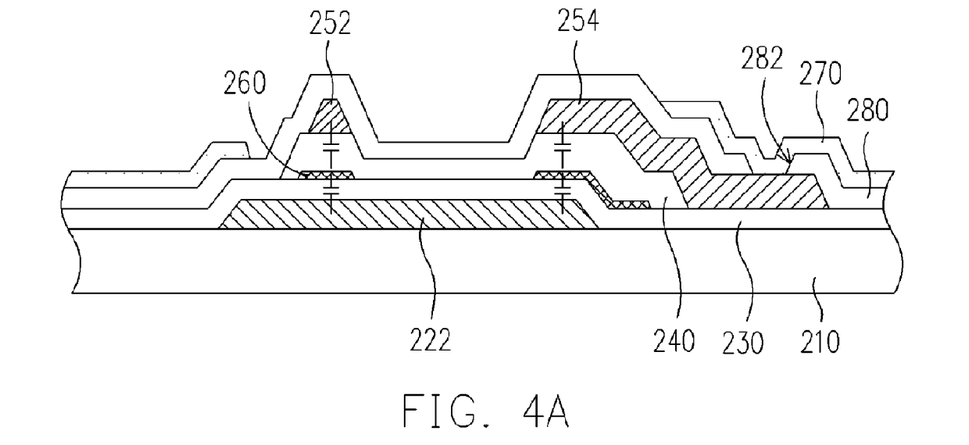
FIG. 4A shows a cross-sectional view of the line II-II' shown in FIG. 3.

FIG. 3 shows a top view of a pixel structure of a preferred embodiment of the present invention. FIG. 4A shows a cross-sectional view of the line II-II' shown in FIG. 3. Referring to FIGS. 3 and 4A, a pixel structure 200 of this embodiment comprises a substrate 210, a first metal layer 220, a dielectric layer 230, a semiconductor layer 240, a second metal layer 250, a patterned floating metal layer 260 and a pixel electrode 270. The first metal layer 220, disposed on the substrate 210, comprises a gate 222 and a scan line 224 electrically thereto. The dielectric layer 230, covered by the semiconductor layer 240, is disposed on the substrate 210 and overlaps the first metal layer 220. The second metal layer 250 comprises a source/drain 252/254, disposed on the semiconductor layer 240 and partially overlapping the gate 222, and a data line 256, electrically connects to the source 252 and partially overlaps the scan line 224. The pixel electrode 270 electrically connects to the drain 254. In addition, the patterned floating metal layer 260 is disposed between the dielectric layer 230 and the semiconductor layer 240 and beneath the source/drain 252/254 and partially overlapping the gate 222.

Said pixel structure 200 further comprises a protection layer 280, disposed on the substrate 210 and overlapping the first metal layer 220 and the second layer 250. Additionally, the protection layer 280 further comprises an opening 282 for exposing the drain 254, wherein the pixel electrode 270 electrically connects to the drain 254 through the opening 282 of the protection layer 280. Additionally, material of the pixel electrode 270 may be Indium Tin Oxide (ITO), Indium Zinc Oxide (IZO) or other transparent conductor materials. The semiconductor layer 240 may comprise a channel layer and an ohmic contact layer disposed on the channel layer. In addition, material of the patterned floating metal layer 260 may be transparent metal (such as, ITO,IZO) or other opaque metal (such as, Al, Ni and Cr), thickness of which ranges from 100 angstrom to 1800 angstrom, preferably, from 500 angstrom to 1500 angstrom.

The parasitic capacitance between the gate 222 and the source/drain 252/254 not only causes a signal distortion, but also affects the pixel's voltage and degrades the display quality of the LCD. Accordingly, in this embodiment, the patterned floating metal layer 260 is deposed between the gate 222 and the source 252, and between the gate 222 and the drain 254, so that parasitic capacitances connected in series can be formed between the gate 222 and the patterned floating metal layer 260, and between the patterned floating metal layer 260 and the source 252. In the meanwhile, parasitic capacitances connected in series can be formed between the gate 222 and the patterned floating metal layer 260, and between the patterned floating metal layer 260 and the drain 254.

The parasitic capacitances connected in series, produce capacitances in total less than that of the said capacitances, respectively. Hence, the pixel structure 200 of this embodiment can reduce the parasitic capacitance's effect between the gate and the source/drain as well as improve the display quality of the LCD and increase the tolerance of designing the display panel.

Figure 4B:
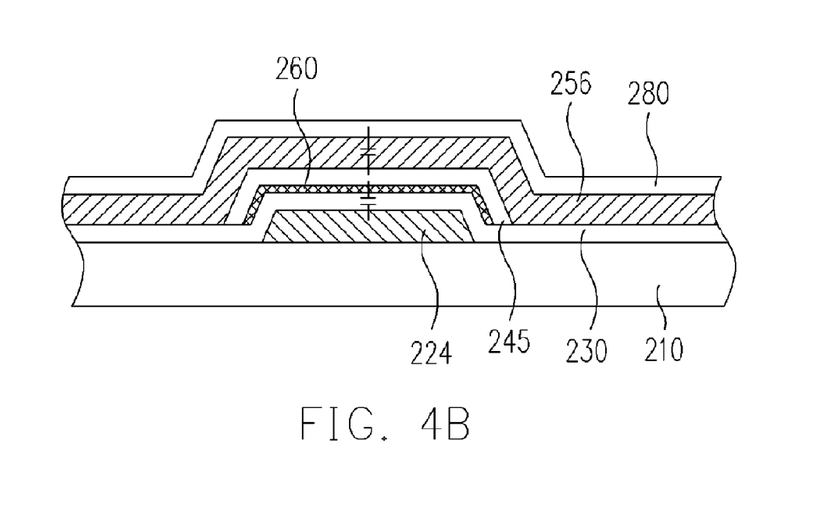
FIG. 4B shows a cross-sectional view of the line III-III' shown in FIG. 3.

FIG. 4B shows a cross-sectional view of the line III-III' shown in FIG. 3. Referring to FIGS. 3 and 4B, the concept of the implementation of capacitances connected in series discussed above can broadly apply to the overlapped area between the first metal layer and the second metal layer, in addition to applying to the gate and the source/drain. In other words, the patterned floating metal layer 260 is also disposed at the overlapped area between the scan line 224 and the data line 254. Furthermore, the pixel structure 200 further comprises a pad layer 245, disposed on the dielectric layer 239 located between the scan line 224 and the data line 250. The patterned floating metal layer 260 is disposed between the pad layer 245 and the dielectric layer 230. Accordingly, the parasitic capacitance between the scan line 224 and the data line 245 has less affect on a transmitted signal; therefore, the display quality of the LCD upgrades. In this embodiment, the pad layer 245 and the semiconductor layer 240 are formed on the same layer.

Figure 5:
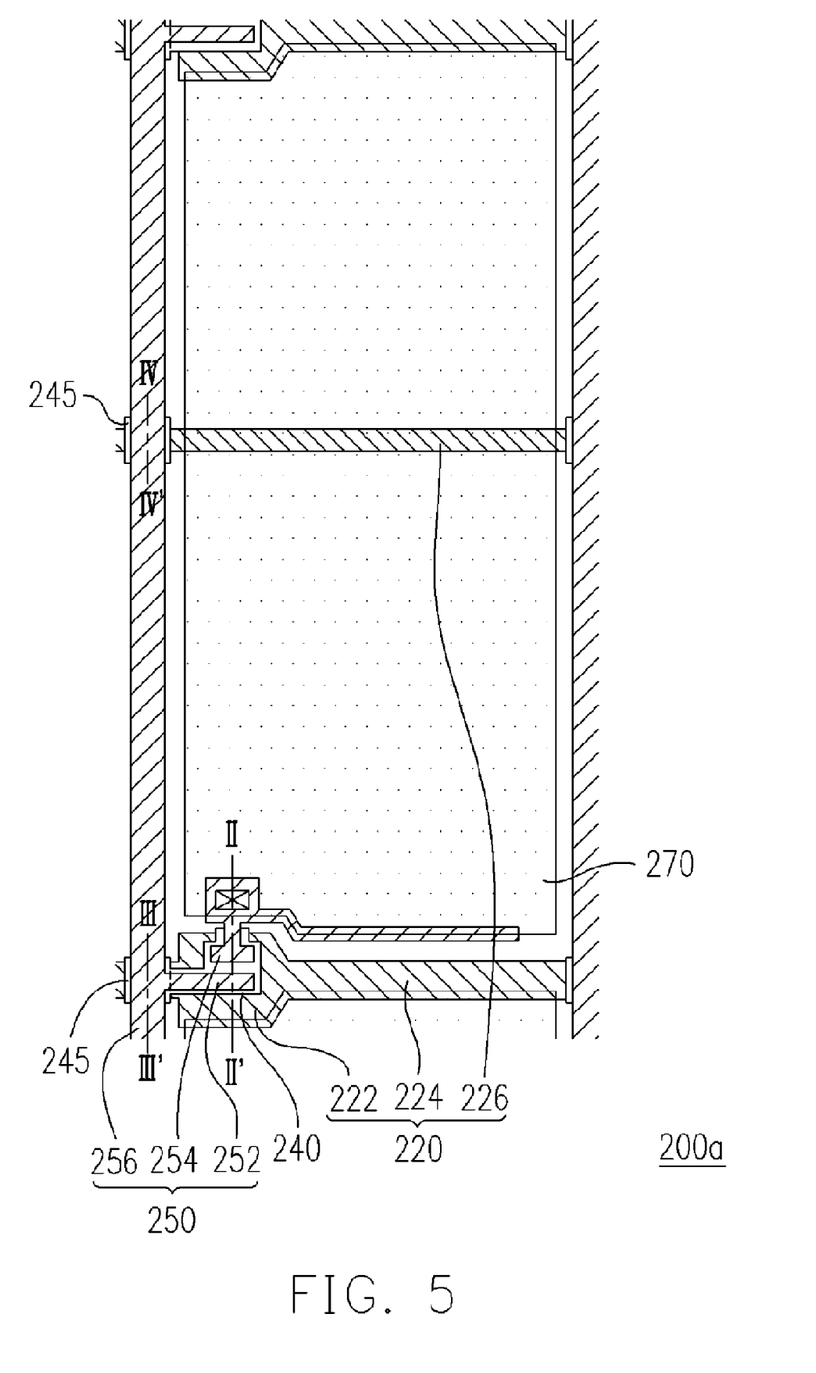
FIG. 5 shows a top view of another pixel structure of a preferred embodiment of the present invention.
Figure 6:
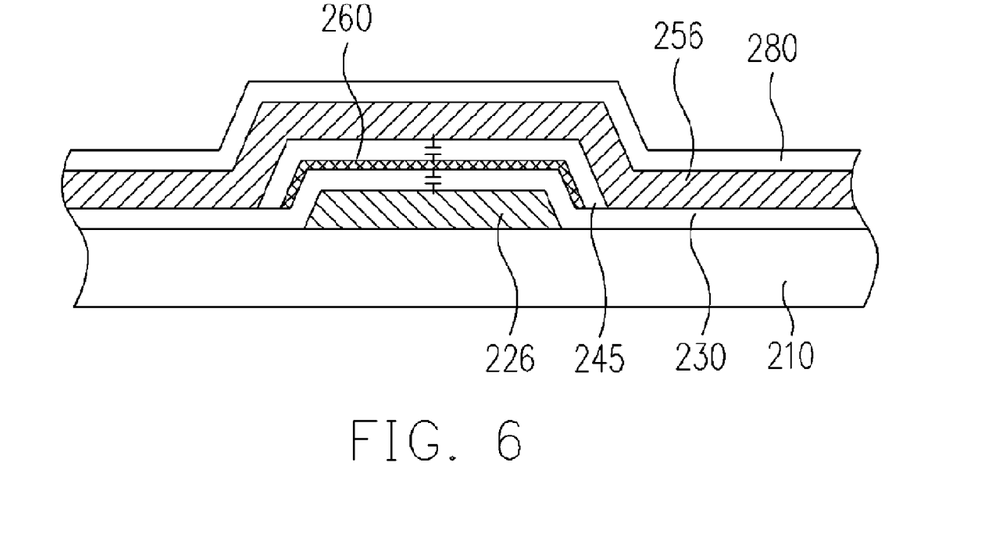
FIG. 6 shows a cross-sectional view of the line IV-IV' shown in FIG. 5.

FIG. 5 shows a top view of another pixel structure of a preferred embodiment of the present invention. FIG. 6 shows a cross-sectional of the line IV-IV' shown in FIG. 5. Referring to FIGS. 5 and 6, this pixel structure 200a is similar to the pixel structure 200, except for the first metal 200 of the pixel structure 200a further comprising a common line 226, substantially parallel to the scan line 224 and partially overlap the data line 256. Additionally, to reduce the effect of the parasitic capacitance between the common line 226 and the data line 256 on the transmitted signals, in the pixel structure 200a, the pad layer 245 is further disposed on the dielectric layer 230 located between the common line 226 and the data line 256, and the patterned floating metal layer 260 is also disposed between the dielectric layer 230 and the pad layer 245.

The Second Embodiment

Figure 7:
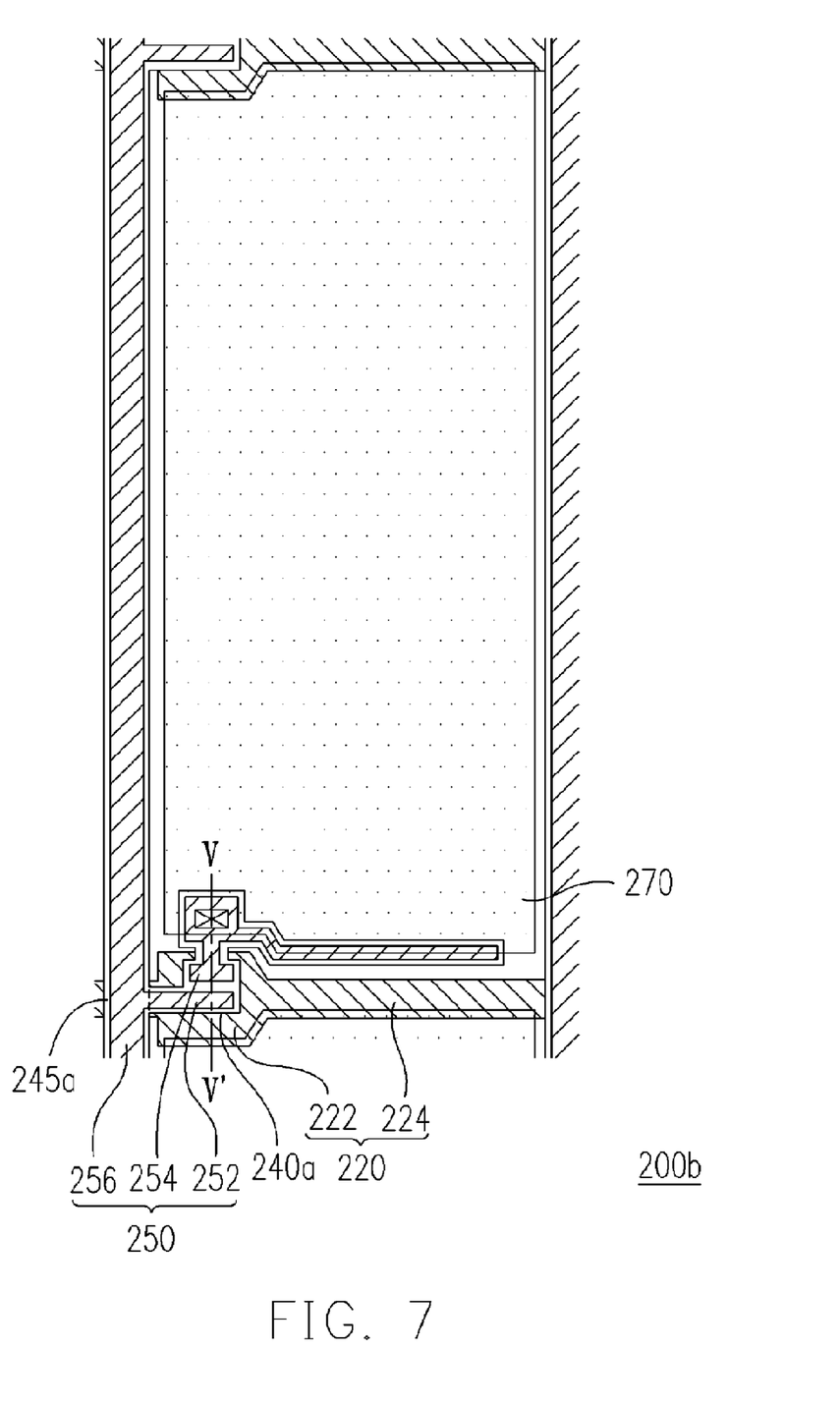
FIG. 7 schematically shows a top view of a pixel structure of another preferred embodiment of the present invention.
Figure 8:
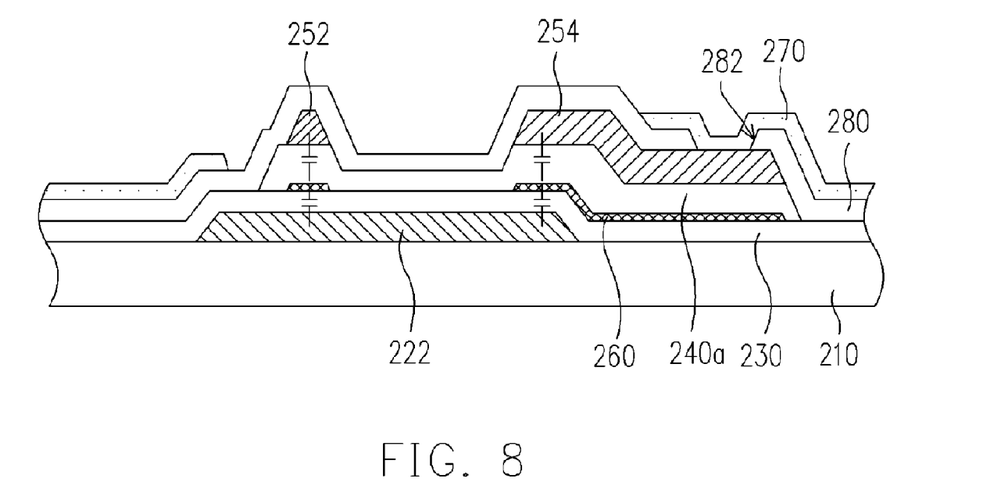
FIG. 8 shows a cross-sectional view of the line V-V' shown in FIG. 7.

FIG. 7 schematically shows a top view of a pixel structure of another preferred embodiment of the present invention. FIG. 8 shows a cross-sectional view of the line V-V' shown in FIG. 7. Referring to FIGS. 7 and 8, to save the cost of a mask, in this embodiment, a mask for forming the patterned floating metal layer 260 is identical to the one for forming the second metal 250, so that the pattern of the patterned floating metal layer 260 is identical to that of the second metal 250. Compared to the semiconductor layer 240 of the first embodiment, the patterns of the patterned floating metal layer 260 and the second metal 250 are identical and the semiconductor layer 240a of this embodiment needs to extend in a way to overlap the patterned floating metal layer 260 beneath the drain 254 to prevent the patterned floating metal layer 260 from being electrically connecting to the drain 254. Additionally, a pad layer 245a of this embodiment needs to extend in a way to overlap the patterned floating metal layer 260 located beneath the data line 256 to prevent the patterned floating metal layer 260 from being electrically connecting to data line 256.

When the transparent metal is selected as the material of the patterned floating metal layer 260, area of the semiconductor layer 240 located under the drain 254 is mostly and directly radiated by the light from a backlight source of the LCD without protection of the gate 222. Accordingly, the radiated semiconductor layer 240 deteriorates and causes a photo-induced leakage current. In this embodiment, opaque metal is selected as the material of the patterned floating metal layer 260 and the semiconductor layer 240 located under the drain 254 will not be deteriorated because of the protection of the patterned floating metal layer 260. Therefore, photo-induced leakage current reduces and the display quality of the LCD upgrades.

In summary, the pixel structure of the present invention has at least the following advantages:

(1) The present invention utilizes the principle that total capacitance of the two capacitances connected in series is less than that of said capacitances, respectively. Therefore, the patterned floating metal layer 260 is disposed between the first metal layer and the second metal layer, so as to form the two parasitic capacitances connected in series to reduce the parasitic capacitance between the first metal layer and the second metal layer and to improve display quality and the tolerance of designing the LCD panel.

(2) In the second embodiment, an extra mask is not necessary due to the same mask's used to from the patterned floating metal layer and the second metal layer to lower fabricating cost because of reducing the parasitic capacitance between the first metal layer and the second metal layer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:
a substrate,
a first metal layer, disposed on the substrate and comprising a gate and a scan line electrically connected to the gate;
a dielectric layer, disposed on the substrate and overlapping the first metal layer;
a semiconductor layer, disposed on the dielectric layer located over the gate;
a second metal layer, comprising a source/drain, disposed on the semiconductor layer and partially overlapping the gate, and a data line, electrically connected to the source and partially overlapping the scan line;
a patterned floating metal layer, disposed between the dielectric layer and the semiconductor layer, beneath the source/drain, wherein a part of the patterned floating metal layer overlapping with the source is isolated from a part of the patterned floating metal layer overlapping with the drain; and
a pixel electrode, connected to the drain.

2. The pixel structure of claim 1, further comprises a pad layer, disposed over the dielectric layer located between the scan line and the data line and the patterned floating metal layer disposed between the pad layer and the dielectric layer.

3. The pixel structure of claim 1, wherein the pad layer and the semiconductor layer are formed on the same layer.

4. The pixel structure of claim 1, wherein material of the patterned floating metal layer comprises transparent metal.

5. The pixel structure of claim 1, wherein material of the patterned floating metal layer comprises opaque metal.

6. The pixel structure of claim 1, wherein the thickness of the patterned floating metal layer ranges from 100 angstrom to 1800 angstrom.

7. The pixel structure of claim 1, wherein the thickness of the patterned floating metal layer ranges from 500 angstrom to 1500 angstrom.

8. The pixel structure of claim 1, wherein the semiconductor layer comprises a channel layer and an ohmic contact layer disposed on the channel layer.

9. The pixel structure of claim 1, further comprising a protection layer, disposed on the substrate and overlapping the first metal layer and the second metal layer.

10. The pixel structure of claim 9, wherein the protection layer further comprises an opening for exposing the drain and the pixel electrode electrically connected to the drain through the opening of the protection layer.

11. The pixel structure of claim 1, wherein the patterned floating metal layer is only disposed within an overlapping region between the first metal layer and the second metal layer.

* * * * *